US012214995B2

United States Patent
Illán García et al.

(10) Patent No.: US 12,214,995 B2
(45) Date of Patent: Feb. 4, 2025

(54) SAFETY BRAKE SYSTEM

(71) Applicant: Otis Elevator Company, Farmington, CT (US)

(72) Inventors: Juan Antonio Illán García, Madrid (ES); Javier Muñoz Sotoca, Madrid (ES); Manuel Garcia Canales, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/836,448

(22) Filed: Jun. 9, 2022

(65) Prior Publication Data

US 2023/0143819 A1 May 11, 2023

(30) Foreign Application Priority Data

Nov. 5, 2021 (EP) ..................................... 21383003

(51) Int. Cl.
*B66B 5/18* (2006.01)
*B66B 5/00* (2006.01)
(Continued)

(52) U.S. Cl.
CPC .............. *B66B 5/18* (2013.01); *B66B 5/0031* (2013.01); *F16D 59/02* (2013.01); *F16D 65/02* (2013.01)

(58) Field of Classification Search
CPC ......... B66B 5/18; B66B 5/0031; F16D 65/02; F16D 59/02
See application file for complete search history.

(56) References Cited

U.S. PATENT DOCUMENTS

| 4,538,706 A | 9/1985 | Koppensteiner |
| 6,523,650 B1 | 2/2003 | Pribonic et al. |
| (Continued) | | |

FOREIGN PATENT DOCUMENTS

| CN | 101049882 A | 10/2007 |
| CN | 103552473 A | 2/2014 |
| (Continued) | | |

OTHER PUBLICATIONS

US 9,884,745 B2, 02/2018, Fargo (withdrawn)
European Search Report for application EP 21383003.7, dated Apr. 11, 2022, 57 pages.

*Primary Examiner* — Michael R Mansen
*Assistant Examiner* — Michelle M Mudwilder
(74) *Attorney, Agent, or Firm* — CANTOR COLBURN LLP

(57) ABSTRACT

A safety brake system (40; 240) for use in a conveyance system. The safety brake system (40; 240) includes a guide rail (20) and a conveyance component moveable along the guide rail (20). The safety brake system (40; 240) includes a safety brake (42; 242), a linkage mechanism (56; 256) and an actuator (44; 144; 244) for the safety brake (42; 242). The safety brake (42; 242) is moveable between a non-braking position where the safety brake (42; 242) is not in engagement with the guide rail (20) and a braking position where the safety brake (42; 242) is engaged with the guide rail (20). The actuator (44; 144; 244) is configured to be mounted to the conveyance component and positioned between first and second ferromagnetic components. The actuator includes an array of magnetic components including a first magnetic component adjacent to and arranged between two second magnetic components.

13 Claims, 12 Drawing Sheets

(51) Int. Cl.
*F16D 59/02* (2006.01)
*F16D 65/02* (2006.01)

(56) References Cited

U.S. PATENT DOCUMENTS

| | | |
|---|---|---|
| 6,659,237 B1 | 12/2003 | Pribonic |
| 7,598,646 B2 | 10/2009 | Cleveland |
| 9,558,876 B2 | 1/2017 | Catalan |
| 10,759,613 B2 | 9/2020 | Neubauer |
| 10,854,489 B2 | 12/2020 | Lee et al. |
| 11,050,336 B2 | 6/2021 | Diehl et al. |
| 11,485,610 B2* | 11/2022 | Munoz ...................... B66B 5/18 |
| 2007/0272503 A1* | 11/2007 | Kigawa ..................... B66B 5/18 187/379 |
| 2012/0211311 A1* | 8/2012 | Piech ........................ B66B 5/16 187/351 |
| 2015/0240894 A1* | 8/2015 | Piech ........................ B66B 5/18 188/163 |
| 2016/0236904 A1 | 8/2016 | Witczak et al. |
| 2017/0001835 A1* | 1/2017 | Hu ........................... F16D 65/16 |
| 2017/0129741 A1* | 5/2017 | Hu ........................... F16D 59/02 |
| 2018/0002142 A1 | 1/2018 | Piech et al. |
| 2018/0222718 A1 | 8/2018 | Khzouz et al. |
| 2018/0269765 A1 | 9/2018 | Fargo et al. |
| 2019/0144240 A1* | 5/2019 | Steinhauer ................ B66B 1/06 187/376 |
| 2019/0352128 A1 | 11/2019 | Korhonen et al. |
| 2020/0048042 A1* | 2/2020 | Sanchez Munoz ....... B66B 5/18 |
| 2020/0115189 A1 | 4/2020 | Dube |
| 2020/0130985 A1* | 4/2020 | Ruhnke .................... B66B 5/22 |
| 2021/0024329 A1 | 1/2021 | Piitulainen et al. |
| 2021/0078830 A1 | 3/2021 | Hakala et al. |
| 2021/0078831 A1 | 3/2021 | Raasina et al. |
| 2022/0402726 A1* | 12/2022 | Geisshüsler ............. B66B 5/22 |

FOREIGN PATENT DOCUMENTS

| | | |
|---|---|---|
| CN | 105591523 A | 5/2016 |
| CN | 105621192 A | 6/2016 |
| CN | 105621193 A | 6/2016 |
| CN | 105655087 A | 6/2016 |
| CN | 205723050 U | 11/2016 |
| CN | 106374718 A | 2/2017 |
| CN | 106411101 A | 2/2017 |
| CN | 106744223 A | 5/2017 |
| CN | 105565107 B | 3/2019 |
| CN | 209922683 U | 1/2020 |
| CN | 212258750 U | 12/2020 |
| KR | 101009465 B1 | 1/2011 |
| KR | 101109019 B1 | 1/2012 |

* cited by examiner

SAFETY BRAKE SYSTEM

FOREIGN PRIORITY

This application claims priority to European Patent Application No. 21383003.7, filed Nov. 5, 2021, and all the benefits accruing therefrom under 35 U.S.C. § 119, the contents of which in its entirety are herein incorporated by reference.

TECHNICAL FIELD

This disclosure relates to a safety brake system for use within a conveyance system such as an elevator system, and to a method of operating a safety brake in a safety brake system.

BACKGROUND

Many elevator systems include a hoisted elevator car, a counterweight, a tension member, which connects the hoisted elevator car and the counterweight, and a sheave that contacts the tension member. During operation of such an elevator system, the sheave may be driven by a machine to move the elevator car and the counterweight through the hoistway, with their movement being guided by guide rails. Typically a governor is used to monitor the speed of the elevator car. According to standard safety regulations, such elevator systems must include an emergency braking device (known as a safety brake or "safety gear") which is capable of stopping the elevator car from moving downwards, even if the tension member breaks, by gripping a guide rail.

The risks associated with freefall of an elevator car in an elevator system are particularly acute for elevator systems employed in high-rise buildings, where more significant over speed may occur due to the increased drop. The actuation of the safety brake is usually mechanically controlled. An elevator system employing a mechanical governor and mechanically-actuated safety brake is shown in FIG. 1, and described in greater detail below.

Electromechanical actuators have also been proposed, wherein a safety controller is in electrical communication with an electromagnetic component that can be controlled to effect movement of the safety brake via a mechanical linkage. It is an aim of the present disclosure to provide an improved safety brake system.

SUMMARY

According to a first aspect of this disclosure there is provided a safety brake system for use in a conveyance system including a guide rail and a conveyance component moveable along the guide rail, the safety brake system comprising: a safety brake moveable between a non-braking position where the safety brake is not in engagement with the guide rail and a braking position where the safety brake is engaged with the guide rail; a linkage mechanism; and an actuator for the safety brake, the actuator being configured to be mounted to the conveyance component and positioned between first and second ferromagnetic components, the actuator comprising: an array of magnetic components comprising a first magnetic component adjacent to and arranged between two second magnetic components, wherein the first magnetic component comprises one of a permanent magnet and an electromagnet and wherein the second magnetic components each comprise the other of a permanent magnet and an electromagnet, wherein the magnetic components of the array are arranged such that when the electromagnet of the first or second magnetic components is in a first state, the actuator is held in a first position against the first ferromagnetic component, wherein when the electromagnet of the first or second magnetic components is switched from the first state to a second state, the magnetic field between the array and the first ferromagnetic component is reduced and the magnetic field between the array and the second ferromagnetic component is augmented so as to move the actuator from the first position to a second position against the second ferromagnetic component, and wherein the linkage mechanism is coupled between the safety brake and the actuator such that movement of the actuator from the first position to the second position when the electromagnet is switched from the first state to the second state causes the safety brake to move into the braking position.

As the actuator is moved from the first position to the second position when the electromagnet is switched from the first state to the second state, a simple and reliable safety brake system may be provided which may be triggered even if a relatively large distance is provided between the first and second ferromagnetic components.

It will be appreciated by those skilled in the art that the first and second magnetic components may be arranged in the array of magnetic components such that the direction of the magnetic field of the first magnetic component is substantially perpendicular to the direction of the magnetic field of the two second magnetic components. The first of the two second magnetic components may be arranged such that the direction of its magnetic field is opposite to the direction of the magnetic field of the second of the two second magnetic components. In this regard, the first and second magnetic components may be arranged such that each next component of the array of magnetic components follows a spatially rotating pattern of magnetization.

In other examples, the first and second magnetic components may be arranged in the array of magnetic components such that the direction of the magnetic field of the first magnetic component is at an angle to the direction of the magnetic field of the two second magnetic components, where the angle may for example be between 45° and 90°. The first of the two second magnetic components may be arranged such that the direction of its magnetic field is at an angle of between 90° and 180° to the direction of the magnetic field of the second of the two second magnetic components. In this regard, the first and second magnetic components may be arranged such that each next component of the array of magnetic components follows a spatially rotating pattern of magnetization, wherein the magnetic field of each next component is rotated by an angle of, for example, between 45° and 90° relative to the previous component.

The array of magnetic components may act as a one-sided flux structure when the electromagnet(s) of the first component or the second magnetic components is in the second state. The array of magnetic components may form a Halbach array when the electromagnet(s) of the first component or the second magnetic components is in the second state.

It will be understood that when the electromagnet of the first or second magnetic components is switched from the first state to the second state, the magnetic field between the array and the first ferromagnetic component may be reduced such that there is no attractive force or there is negligible attractive force between the array of magnetic components and the first ferromagnetic component.

It will further be understood that when the electromagnet of the first or second magnetic components is switched from the first state to the second state, the actuator is moved from the first position to the second position due to the attractive magnetic force between the array of magnetic components and the second ferromagnetic component.

In one set of examples, the electromagnet of the first or second magnetic components may be switched from the first to the second state, for example, if the conveyance component is detected to be moving too fast or accelerating at too great of a rate.

It will be understood that when the first magnetic component is a permanent magnet, the two second magnetic components are electromagnets and when the first magnetic component is an electromagnet, the two second magnetic components are permanent magnets.

In examples wherein the two second magnetic components each comprise an electromagnet, references made to the electromagnet of the first or second magnetic components is to be understood as describing a first and a second electromagnet.

In some embodiments, the components of the array of magnetic components may be in contact with one another. In other embodiments, the components of the array of magnetic components may be spaced apart from one another.

In a set of examples, movement of the actuator from the first position to the second position when the electromagnet of the first or second magnetic components is switched from the first state to the second state causes the safety brake to move into the braking position directly. In another set of examples, movement of the actuator from the first position to the second position when the electromagnet of the first or second magnetic components is switched from the first state to the second state causes the safety brake to move into the braking position indirectly.

It will further be understood that, in some examples of the disclosed safety brake system, there is no dependence on frictional forces to actuate the safety brake. Rather, the linkage mechanism may be caused to move to actuate the safety brake as a direct result of the movement of the actuation component, in other words, by the movement of the actuation component from the first position to the second position when the electromagnet is switched from the first state to the second state being transferred to the safety brake via the linkage mechanism.

The disclosed safety brake system may require fewer components than prior art mechanical safety brake devices which may therefore reduce the space required by the safety brake system. In addition, the reduction in the number of components may reduce the cost of installation and service. The disclosed safety brake system may further provide a system which is simple to maintain and provides robust performance.

In one set of examples, when in the first state, the electromagnet of the first or second magnetic component may not be energised. In these examples, the actuator may be held in the first position against the first ferromagnetic component by the permanent magnet of the first or second magnetic components.

In this set of examples, the actuator may be held in the first position by an attractive magnetic force between the permanent magnet of the first or second magnetic components and the first ferromagnetic component. In this set of examples, electric current need not be supplied to the electromagnet of the first or second magnetic components while the actuator is in the first position thus achieving a reliable and energy efficient system.

In a set of examples, the magnetic components of the array may be arranged such that when the actuator is in the second position, and when the electromagnet of the first or second magnetic components is not energised, the permanent magnet of the first or second magnetic components act to hold the actuator in the second position against the second ferromagnetic component.

In this set of examples, the actuator may be held in the second position by an attractive magnetic force between the permanent magnet of the first or second magnetic components and the second ferromagnetic component. In this set of examples, electric current need not be supplied to the electromagnet of the first or second magnetic components while the actuator is in the second position thus achieving a reliable and energy efficient system.

In a set of examples, when in the second state, the electromagnet of the first or second magnetic component may be energised with a first polarity and, when in the first state, the electromagnet of the first or second magnetic component may be energised with a second, opposite polarity.

In this set of examples, when the electromagnet is in the first state, the magnetic field between the array and the first ferromagnetic component is augmented and the magnetic field between the array and the second ferromagnetic component is reduced. In this regard, the actuator is held in the first position against the first ferromagnetic component by the attractive force between the array of magnetic components and the first ferromagnetic component. In this set of examples, when the electromagnet is in the first state there may be no attractive magnetic force or there may be negligible attractive magnetic force between the array of magnetic components and the second ferromagnetic component. Thus, the actuator may be less susceptible to false actuation.

In a set of examples, when the electromagnet of the first or second magnetic components is switched to a third state, the magnetic field between the array and the first ferromagnetic component may be augmented and the magnetic field between the array and the second ferromagnetic component may be reduced so as to move the actuator from the second position to the first position.

In a set of examples, the electromagnet of the first or second magnetic components may be energised with a first polarity in the second state, and may be energised with a or the second, opposite polarity in the third state.

It will be understood, that when the electromagnet is energised with a first polarity the magnetic field between the array and the first ferromagnetic component may be augmented and the magnetic field between the array and the second ferromagnetic component may be reduced such that the actuator is moved towards the first ferromagnetic component or is held against the first ferromagnetic component. In addition, when the electromagnet is energised with a second, opposite polarity the magnetic field between the array and the second ferromagnetic component may be augmented and the magnetic field between the array and the first ferromagnetic component may be reduced such that the actuator is moved towards the second ferromagnetic component or is held against the second ferromagnetic component, In a set of examples, the safety brake system may further comprise a mount for attaching the actuator to the conveyance component. In this set of examples, the first ferromagnetic component may be part of or may be fixed to the mount.

In a set of examples, the array may comprise a plurality of first magnetic components and each first magnetic component may be arranged between two second magnetic components. In this set of examples, the first and second ferromagnetic components may be spaced apart in a first direction and the magnetic components of the array may be aligned in a direction perpendicular to, or generally perpendicular to the first direction, for example, within 25° of perpendicular to, the first direction. It will be understood however that in other sets of examples, the magnetic components of the array may be arranged differently and need not be aligned in the direction described above.

In this set of examples, each next magnetic component of the array of magnetic components follows a spatially rotating pattern of magnetization. In some examples, the magnetic component of the array of magnetic components are arranged such that each next magnetic component in the array alternates between a first magnetic component and a second magnetic component. In some examples, the array of magnetic components comprises an odd number of magnetic components.

In one set of examples, the second ferromagnetic component may be the guide rail.

In another set of examples, the second ferromagnetic component may be part of or may be fixed to the mount. In this set of examples, the second ferromagnetic component is fixed with respect to the first ferromagnetic component.

In a set of examples, the actuator may further comprise a contact portion configured to be spaced apart from the guide rail when the actuator is in the first position and configured to be in contact with the guide rail when the actuator is in the second position. In examples, the contact portion may comprise a high friction surface. In examples, the safety brake system may be configured such that when the conveyance component is moving downwards relative to the guide rail, movement of the actuator to the second position creates an upwards reaction force transmitted by the linkage mechanism to move the safety brake into the braking position.

In examples of the present disclosure, the safety brake device may find use in a variety of conveyance systems, such as elevator systems, people conveyors, goods transporters, etc. The conveyance component that is moveable along a guide rail may be a platform, a counterweight or a cab for transporting goods or people. In some examples, the conveyance system is an elevator system and the conveyance component is an elevator car.

In examples, the actuator may further comprise a ferromagnetic support structure housing the magnetic components of the array so as to guide the magnetic flux produced by the magnetic components of the array to flow through the ferromagnetic support structure.

According to a second aspect of this disclosure there is provided an elevator system comprising: an elevator car driven to move along at least one guide rail; and the safety brake system of any of the above examples, wherein the safety brake is arranged to be moveable between the non-braking position where the safety brake is not in engagement with the guide rail and the braking position where the safety brake is engaged with the guide rail.

In some examples, the actuator may be configured to move relative to the elevator car.

In one set of examples, the elevator system may further comprise a speed sensor and a controller arranged to receive a speed signal from the speed sensor and to selectively switch the electromagnet of the first or second magnetic component from the first state to the second state upon detecting an overspeed or over-acceleration condition for the elevator car based on the speed signal.

In this or another set of examples, the elevator system may further comprise an accelerometer and a controller arranged to receive an acceleration signal from the accelerometer and to selectively switch the electromagnet of the first or second magnetic component from the first state to the second state upon detecting an over-acceleration condition for the elevator car.

In some examples, the controller may be arranged to receive both a speed signal and an acceleration signal from a speed sensor. In other examples, the controller may be arranged to receive both a speed signal and an acceleration signal from an accelerometer.

Therefore, when the elevator car is travelling at overspeed or over-acceleration, selectively switching the electromagnet from the first state to the second state will actuate the safety brake to engage with the guide rail, preventing further motion of the elevator car.

According to a second aspect of this disclosure there is provided a method of operating a safety brake in a safety brake system, the safety brake moveable between a non-braking position where the safety brake is not in engagement with a guide rail and a braking position where the safety brake is engaged with the guide rail, the safety brake system comprising: an actuator mounted to a component moveable along a guide rail and configured to move between first and second ferromagnetic components, the actuator comprising: an array of magnetic components comprising a first magnetic component adjacent to and arranged between two second magnetic components, wherein the first magnetic component comprises one of a permanent magnet and an electromagnet and wherein the second magnetic components each comprise the other of a permanent magnet and an electromagnet; and a linkage mechanism coupled between the safety brake and the actuator, the method comprising: operating the electromagnet of the first or second magnetic component in a first state in a normal mode such that the actuator is held in a first position against the first ferromagnetic component; and operating the electromagnet of the first or second magnetic component in a second state in an emergency stop mode such that the magnetic field between the array and the first ferromagnetic component is reduced and the magnetic field between the array and the second ferromagnetic component is augmented so as to move the actuator from the first position to a second position against the second ferromagnetic component, wherein the linkage mechanism is coupled between the safety brake and the actuator such that movement of the actuator from the first position to the second position when the electromagnet is switched from the first state to the second state causes the safety brake to move into the braking position.

In examples of the present disclosure, the steps of operating the electromagnet of the first or second magnetic components are executed by a controller.

In some examples, operating the electromagnet of the first or second magnetic components comprises supplying a pulse of electric current to the electromagnet. In some examples, operating the electromagnet of the first or second magnetic components comprises supplying continuous electric current to the electromagnet. In some examples, current is supplied to the electromagnet of the first or second magnetic components for a pre-determined duration.

In examples, the method may further comprise detecting an overspeed or over-acceleration of the component and initiating the emergency stop mode by switching the electromagnet of the first or second magnetic component from the first state to the second state.

In one set of examples, the method may further comprise operating the electromagnet of the first or second magnetic component in a first state in a normal mode such that the electromagnet is not energised.

In this set of examples, the actuator may be held in the first position against the first ferromagnetic component by the permanent magnet of the first or second magnetic components. In this set of examples, in the normal mode electric current is not supplied to the electromagnet of the first or second magnetic components thus achieving a reliable and energy efficient system.

In a set of examples, in the emergency mode, the permanent magnet of the first or second magnetic components acts to hold the actuator in the second position against the second ferromagnetic component.

In this set of examples, the actuator may be held in the second position by an attractive magnetic force between the permanent magnet of the first or second magnetic components and the second ferromagnetic component. In this set of examples, electric current is not supplied to the electromagnet of the first or second magnetic components thus achieving a reliable and energy efficient system.

In a set of examples, operating the electromagnet of the first or second magnetic components in the first state in the normal mode may comprise energising the electromagnet with a first polarity and operating the electromagnet of the first or second magnetic components in the second state in the emergency mode may comprise energising the electromagnet with a second, opposite polarity.

In this set of examples, when the electromagnet is in the first state, the magnetic field between the array and the first ferromagnetic component is augmented and the magnetic field between the array and the second ferromagnetic component is reduced. In this regard, the actuator is held in the first position against the first ferromagnetic component by the attractive force between the array of magnetic components and the first ferromagnetic component. In this set of examples, there is no attractive magnetic force or there is negligible attractive magnetic force between the array of magnetic components and the second ferromagnetic component. Thus the actuator is less susceptible to false actuation.

In a set of examples, the method may further comprise operating the electromagnet of the first or second components in a third state such that the magnetic field between the array and the first ferromagnetic component is augmented and the magnetic field between the array and the second ferromagnetic component is reduced so as to move the actuator from the second position to the first position.

In a set of examples, operating the electromagnet of the first or second magnetic components in the second state in emergency mode may comprise energising the electromagnet with a first polarity, and operating the electromagnet of the first or second magnetic component in the third state may comprise energising the electromagnet with a second, opposite polarity.

It will be understood, that when the electromagnet is energised with a first polarity the magnetic field between the array and the first ferromagnetic component may be augmented and the magnetic field between the array and the second ferromagnetic component may be reduced such that the actuator is moved towards the first ferromagnetic component or is held against the first ferromagnetic component. In addition, when the electromagnet is energised with a second, opposite polarity the magnetic field between the array and the second ferromagnetic component may be augmented and the magnetic field between the array and the first ferromagnetic component may be reduced such that the actuator is moved towards the second ferromagnetic component or is held against the second ferromagnetic component, In a set of examples, the method may further comprise attaching the actuator to the conveyance component by a mount. In this set of examples, the first ferromagnetic component may be part of or may be fixed to the mount.

In a set of examples, operating the electromagnet of the first or second magnetic component in the second state in the emergency stop mode so as to move the actuator from the first position to a second position against the second ferromagnetic component may further comprise moving a contact portion of the actuator to be in contact with the second ferromagnetic component, wherein the contact portion is configured to be spaced apart from the guide rail when the actuator is in the first position and configured to be in contact with the guide rail when the actuator is in the second position, and wherein the second ferromagnetic component is a guide rail. In examples, the contact portion may comprise a high friction surface. In examples, the safety brake system may be configured such that when the conveyance component is moving downwards relative to the guide rail, movement of the actuator to the second position creates an upwards reaction force transmitted by the linkage mechanism to move the safety brake into the braking position.

DETAILED DESCRIPTION

Figure 1:
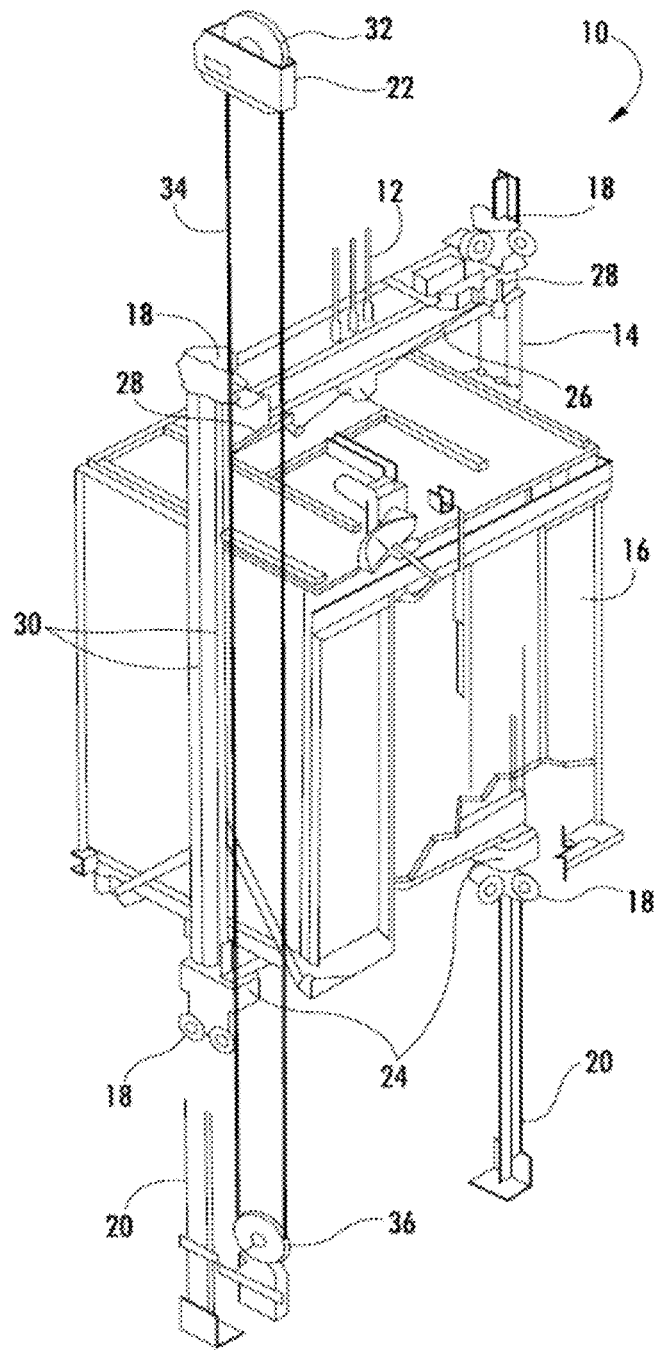
FIG. 1 is a schematic diagram of an elevator system employing a mechanical governor.

FIG. 1 shows a conveyance system, in this example an elevator system, generally indicated at 10. The elevator system 10 includes cables or belts 12, a car frame 14, a conveyance component, in this example an elevator car 16, roller guides 18, guide rails 20, a governor 22, and a pair of safety brakes 24 mounted on the elevator car 16. The governor 22 is mechanically coupled to actuate the safety brakes 24 by linkages 26, levers 28, and lift rods 30. Governor 22 includes a governor sheave 32, rope loop 34, and a tensioning sheave 36. Cables 12 are connected to car frame 14 and a counterweight (not shown in FIG. 1) inside a hoistway. Elevator car 16, which is attached to car frame 14, moves up and down the hoistway by force transmitted through cables or belts 12 to car frame 14 by an elevator drive (not shown) commonly located in a machine room at the top of the hoistway. Roller guides 18 are attached to car frame 14 to guide the elevator car 16 up and down the hoistway along the guide rails 20. Governor sheave 32 is mounted at an upper end of the hoistway. Rope loop 34 is wrapped partially around governor sheave 32 and partially around tensioning sheave 36 (located in this example at a bottom end of the hoistway). Rope loop 34 is also connected to elevator car 16 at lever 28, ensuring that the angular velocity of governor sheave 32 is directly related to the speed of elevator car 16.

In the elevator system 10 shown in FIG. 1, the governor 22, a machine brake (not shown) located in the machine room, and the safety brakes 24 act to stop the elevator car 16 if it exceeds a set speed as it travels inside the hoistway. If elevator car 16 reaches an over-speed or over-acceleration condition, the governor 22 is triggered initially to engage a switch, which in turn cuts power to the elevator drive and drops the machine brake to arrest movement of the drive sheave (not shown) and thereby arrest movement of elevator car 16. If, however, the elevator car 16 continues to experience an over speed condition, governor 22 may then act to trigger the safety brakes 24 to arrest movement of elevator car 16. In addition to engaging a switch to drop the machine brake, governor 22 also releases a clutching device that grips the governor rope 34. Governor rope 34 is connected to the safety brakes 24 through mechanical linkages 26, levers 28, and lift rods 30. As elevator car 16 continues its descent, governor rope 34, which is now prevented from moving by actuated governor 22, pulls on the operating levers 28. The operating levers 28 actuate the safety brakes 24 by moving linkages 26 connected to lift rods 30, which lift rods 30 cause the safety brakes 24 to engage the guide rails 20 to bring the elevator car 16 to a stop.

Mechanical speed governor systems are being replaced in some elevators by electronically-actuated systems. A safety brake system is described herein that is suitable for electronic or electrical control of actuating and resetting a safety brake in an elevator system. It will be understood that the safety brake system of the present disclosure could be used in an elevator system 10 of the type shown in FIG. 1. However, this is only one example of a system in which the safety brake system of the disclosure could be used. The safety brake system of the present disclosure could also be used in any other suitable type of conveyance system. Such other types of conveyance system may include (but are not limited to) hydraulic elevator systems and ropeless elevator systems such as pinched wheel or linear motor propulsion elevator systems.

Figure 2:
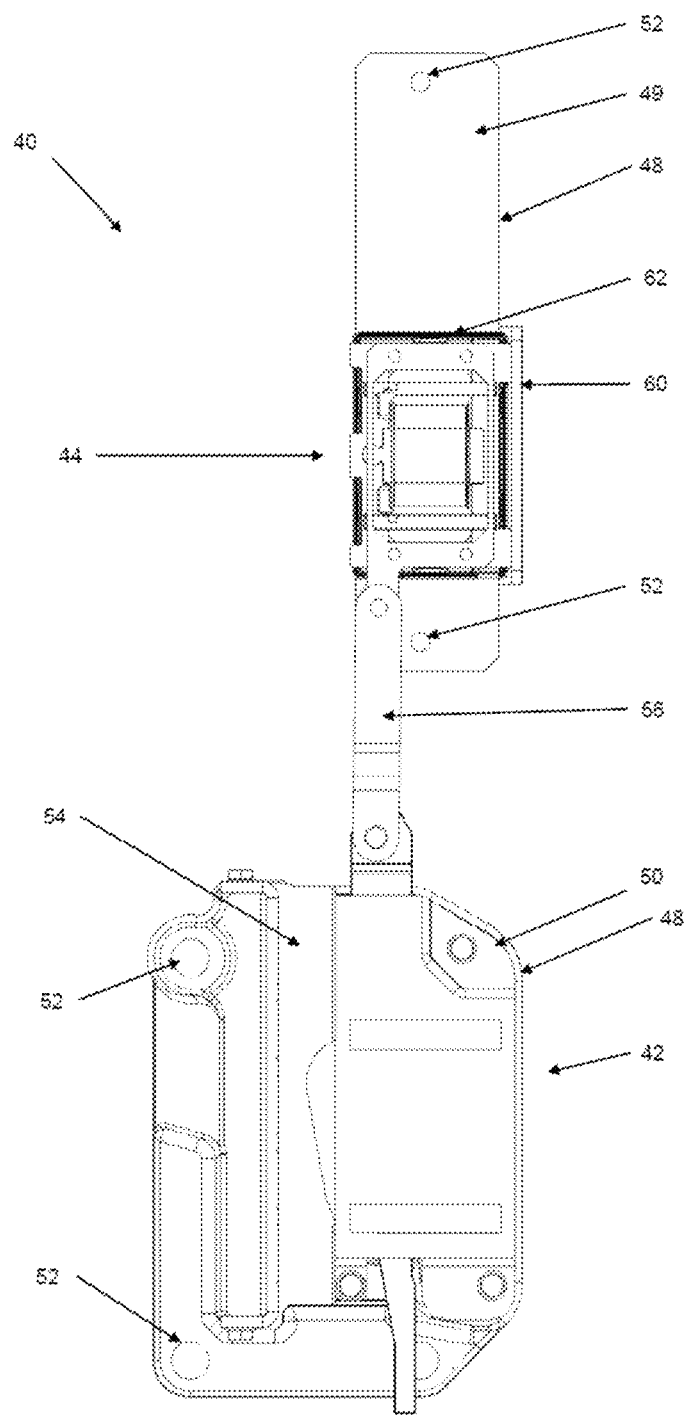
FIG. 2 is a schematic view of a safety brake system according to an example of the present disclosure.

FIG. 2 shows an example of a safety brake system 40 having a safety brake 42, and an actuator 44. The safety brake system 40 can be mounted onto the elevator car 16 of FIG. 1 to actuate the safety brake 42 without relying on a mechanical coupling to the governor 22. The safety brake system 40 of the example includes a mount 48, which may be mounted on the elevator car frame 14. In other examples, the mount 48 may be mounted on an external surface of the elevator car 16 instead. The mount 48 includes apertures 52, which enable fixation of the mount 48 to the car frame 14. The mount 48 comprises an actuator mounting portion 49 and a safety brake mounting portion 50. In this example, the actuator mounting portion 49 and the safety brake mounting portion 50 are separate components as shown in FIG. 2. In other examples, the actuator mounting portion 49 and the safety brake mounting portion 50 could both be parts of the same component. The actuator mounting portion 49 and the safety brake mounting portion 50 of this example both include apertures 52, which enable fixation of the respective mounting portions to the car frame 14. The safety brake system of this example further comprises a guide rail channel 54, which extends along the length of the safety brake 42 and is configured to accommodate the guide rail 20 (not shown in FIG. 2).

The safety brake 42 of the safety brake system 40 is moveable between a non-braking position where the safety brake 42 is not in engagement with the guide rail 20, and a braking position where the safety brake 42 is engaged with the guide rail 20. In the example of FIG. 2, the safety brake 42 is a roller-type safety brake comprising an angled surface and a roller moveable along the surface from a non-braking position to a braking position where the roller is brought into engagement with the guide rail 20. As shown, the safety brake 42 is located below the actuator 44 in this example such that linkage mechanism 56 can act to pull the roller upwardly along the angled surface to move the safety brake 42 into the braking position. However, it will be appreciated that the safety brake 42 may take any suitable form and could instead comprise a wedge-shaped brake pad instead of the roller, or a magnetic brake pad. In some examples, the safety brake may be located above the actuator 44 instead such that, for example, the linkage mechanism can act to push the roller upwardly along the angled surface to move the safety brake into the braking position. Various roller-type safety brakes such as those described above are well-known in the art, for example as seen in U.S. Pat. No. 4,538,706.

Regardless of the exact form of the safety brake 42, the safety brake is coupled to the actuator 44 via a linkage mechanism 56. The actuator 44 is positioned between a first ferromagnetic component and a second ferromagnetic component. In the example of FIG. 2, the first ferromagnetic component is a backing plate 60 for the actuator 44. The backing plate 60 of this example extends outwardly from and perpendicular to the actuator mounting portion 49 in a direction away from the car frame 14. The second ferromagnetic component in the example of FIG. 2 is the guide rail 20 (not shown in FIG. 2).

Figure 3:
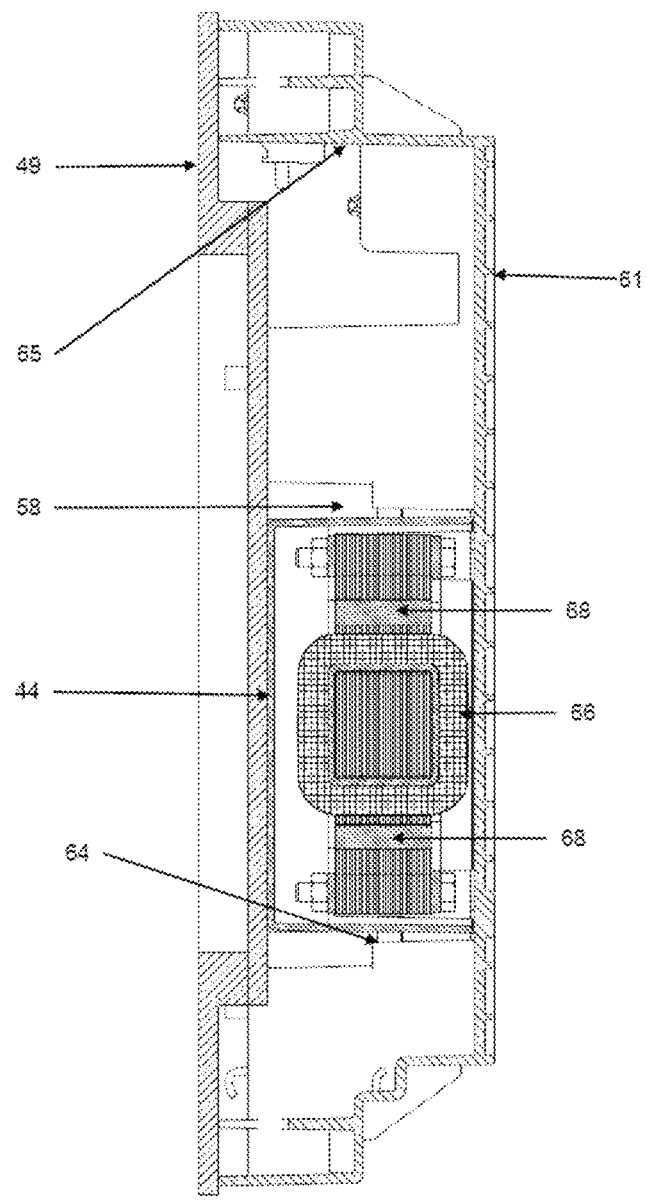
FIG. 3 is a schematic cross-sectional view of part of a safety brake system according to an example of the present disclosure.
Figure 4:
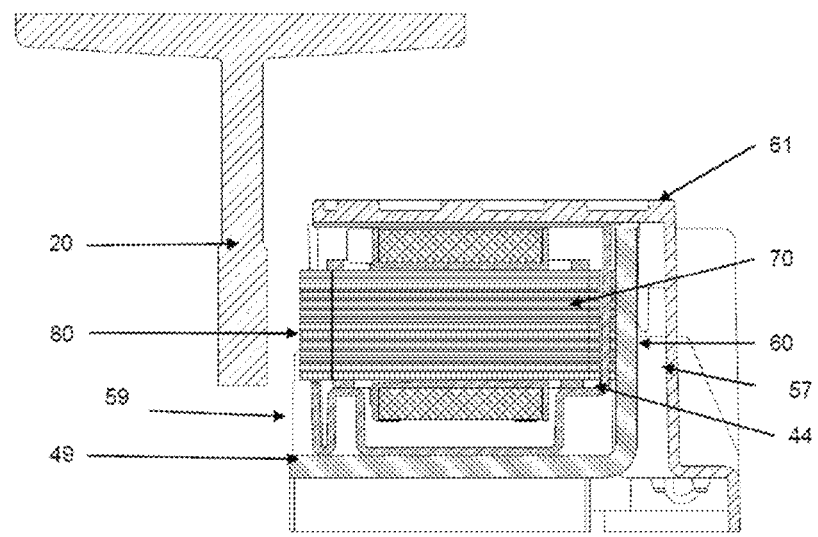
FIG. 4 is a different schematic cross-sectional view of the part of a safety brake system of FIG. 3.

With reference to FIG. 3 and FIG. 4, the safety brake system 40 further comprises a cover 61 attached to actuator mounting portion 49 so as to define a channel 58 between the cover 61 and the actuator mounting portion 49. The actuator 44 is located in the channel 58 between the actuator mounting portion 49 and the cover 61 such that lateral movement of the actuator 44 in relation to the guide rail 20 is restricted by the actuator mounting portion 49 in one direction and by the cover 61 in the opposite direction. Thus, the actuator 44 may be configured to move toward and away from the guide rail and be restrained or limited against movement in other lateral directions such as the direction perpendicular to the direction of movement toward and away from the guide rail. A back end 57 of the channel 58 is at least partially defined by backing plate 60. Backing plate 60 limits movement of the actuator in a direction away from the guide rail 20. A front end 59 of the channel 58 is open as to allow movement of the actuator 44 towards the guide rail 20 and/or contact of the actuator 44 with the guide rail 20. The actuator 44 is free to move along the channel 58 in a direction along the guide rail 20 between a first axial end 64 and a second axial end 65 of the channel 58. The first axial end 64 comprises at least one opening (not shown) through which the linkage mechanism 56 extends. In the example described, the first axial end 64 of the channel 58 and the second axial end 65 of the channel 58 are defined by the cover. In other examples, the first axial end 64 of the channel 58 and the second axial end 65 of the channel 58 may be defined at least partially by the mounting portion 49.

Figure 5:
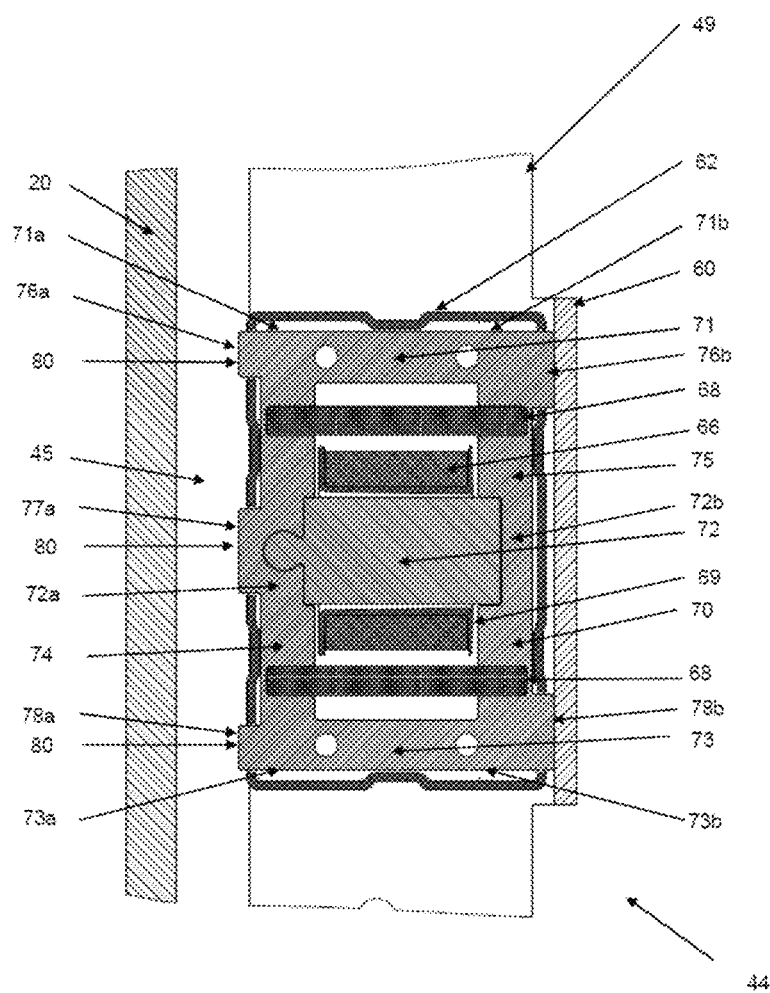
FIG. 5 is a schematic cross-sectional view of part of a safety brake system according to an example of the present disclosure with the actuator in a first position and with the safety brake in a first, non-braking position.

The actuator 44 of the safety brake system 40 of FIG. 2 is shown in greater detail in FIG. 5. The actuator 44 comprises an array of magnetic components and is configured to be moved from a first position, adjacent the backing plate 60 (the first ferromagnetic component of this example) to a second position adjacent the guide rail 20 (the second ferromagnetic component of this example). The array of magnetic components comprises at least one first magnetic component and at least two second magnetic components. The first magnetic component is adjacent to and arranged between the two second magnetic components. The first magnetic component comprises one of a permanent magnet and an electromagnet and the second magnetic components each comprise the other of a permanent magnet and an electromagnet. Thus, when the first magnetic component is a permanent magnet, the two second magnetic components are electromagnets and when the first magnetic component is an electromagnet, the two second magnetic components are permanent magnets.

In some examples, for example as shown in FIG. 5, the first and second ferromagnetic components are spaced apart from each other in a first direction and the magnetic components of the array are aligned in a direction perpendicular to the first direction, or a direction generally perpendicular to the first direction, for example in a direction within 25° of perpendicular to the first direction. The magnetic components of the array are orientated with respect to their magnetic fields so as to form a Halbach array when current is supplied to the electromagnet(s) of the first or second magnetic components.

In the example of FIG. 5, the array of magnetic components comprises one electromagnet 66 (the first magnetic component) and two permanent magnets 68 (the second magnetic components). The electromagnet 66 is adjacent to and arranged between the two permanent magnets 68 such that the magnetic components are stacked in the direction of the guide rail 20 (generally in the direction perpendicular to the first direction).

The array of magnetic components is configured such that the magnetic fields of the two permanent magnets 68 are opposite in direction to each other. The magnetic field generated by the electromagnet 66 when electric current is supplied to it has a direction substantially perpendicular to that of the two permanent magnets 68. As a result, the magnetic fields generated by electromagnet 66 and the two permanent magnets 68 interact such that the array of magnetic components generates an augmented magnetic field on one side of the array and a reduced magnetic field on another side of the array.

In a set of examples, such as the example of FIG. 5, the north pole of the first of the two permanent magnet 68 faces the north pole of the second of the two permanent magnets 68 such that the magnetic fields of the two permanent magnets 68 are opposite in direction to each other. In the example of FIG. 5, each of the two permanent magnets is orientated with respect to its poles such that the north pole is adjacent to (or faces towards) the electromagnet 66 while the south pole faces away from the electromagnet 66. The polarity of the electromagnet 66 is determined by the direction of current supplied to the magnet. The electromagnet 66 can be energised with a first polarity such that the north pole of the electromagnet 66 faces the guide rail 20 or with a second polarity such that the south pole of the electromagnet 66 faces the guide rail 20.

The actuator 44 of this example further comprises a support structure 70 which houses the electromagnet 66 and the two permanent magnets 68. The support structure 70 can take any suitable shape and, in this example, comprises a frame. In the example of FIG. 5, the frame comprises ferromagnetic material and part of the frame extends through a coil of the electromagnet 66 in order to form the ferromagnetic core of the electromagnet 66. In other examples, the electromagnet 66 may comprise a separate ferromagnetic component as a core. The electromagnet 66 and the two permanent magnets 68 are fixed relative to one another via the support structure 70 such that the electromagnet 66 and two permanent magnets 68 move as a single unit. The electromagnet 66 is located between the two permanent magnets 68 such that the array extends in a vertical direction or, in other words, in a direction parallel to the guide rail 20.

Figure 6:
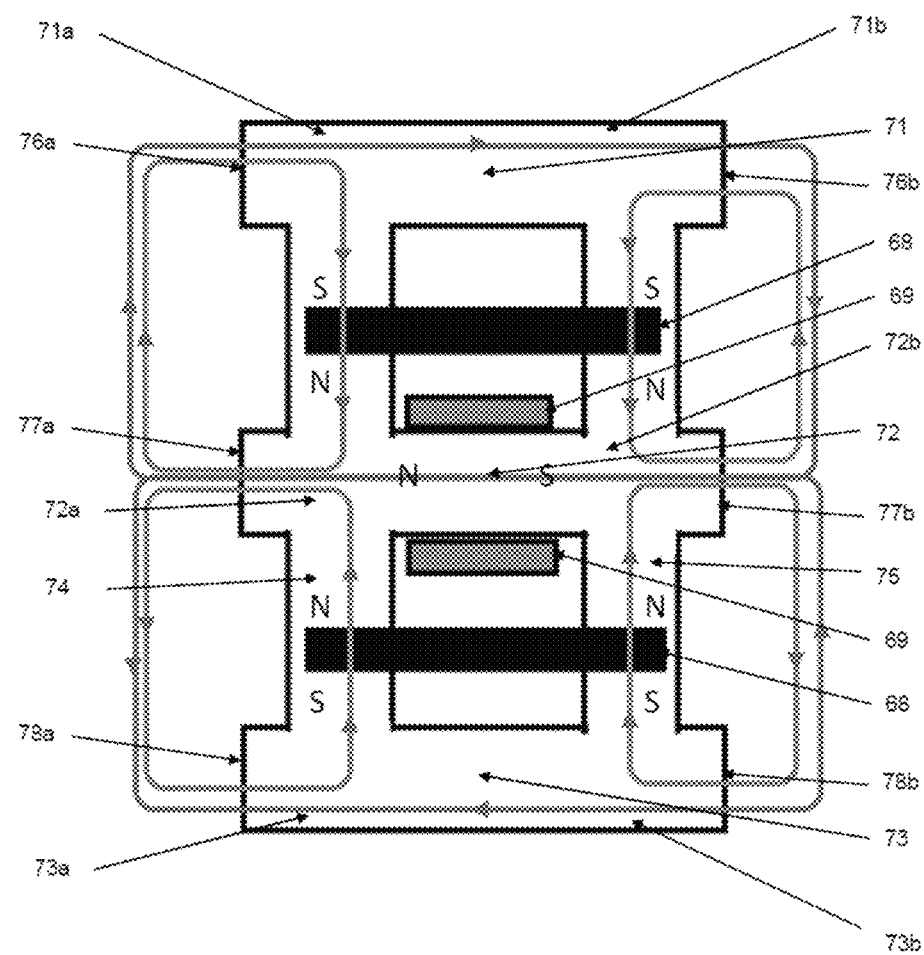
FIG. 6 is a schematic diagram of an actuator of a safety brake system according to an example of the present disclosure.

In the example of FIG. 5 and with reference to FIG. 6, the support structure 70 defines a first outer component 71, a middle component 72 and a second outer component 73. The first outer, middle and second outer components 71, 72, 73 extend in a direction generally parallel to the first direction. The first outer, middle and second outer components 71, 72, 73 are substantially parallel to one another. The first outer, middle and second outer components 71, 72, 73 are spaced apart from one another in a direction generally perpendicular to the first direction. The first outer, middle and second outer components 71, 72, 73 each comprise a first end 71a, 72a, 73a and a second end 71b, 72b, 73b. When the actuator 44 is in position in the elevator system, the first ends 71a, 72a, 73a of the first outer, middle and second outer components 71, 72, 73 are positioned to face the guide rail 20 and to be closer to the guide rail 20 than the second ends 71b, 72b, 73b of the first outer, middle and second outer components 71, 72, 73. The second ends 71b, 72b, 73b of the first outer, middle and second outer components 71, 72, 73 are positioned to face the backing plate 60 and to be closer to the backing plate 60 than the first ends 71a, 72a, 73a of the first outer, middle and second outer components 71, 72, 73.

The support structure 70 further defines a front component 74 and a back component 75 extending in a direction generally perpendicular to the first direction. The front and back components 74, 75 are substantially parallel to one another. The front and back components 74, 75 are spaced apart in a direction generally parallel to the first direction. The front and back components 74, 75 are each connected to each of the first outer, middle and second outer components 71, 72, 73. The front component 74 connects the first ends 71a, 72a, 73a of the first outer, middle and second outer component 71, 72, 73 to one another. The back component 75 connects the second ends 71b, 72b, 73b of the first outer, middle and second outer components 71, 72, 73 to one another.

As shown in FIG. 5 and with reference to FIG. 6, a portion of the first end 71a of the first outer component 71 extends beyond the front component 74 in the first direction (in this example towards the guide rail 20), thus defining a first outer front prong 76*a*. A portion of the first end 72*a* of the middle component 72 extends beyond the front component 74 in the first direction (in this example towards the guide rail 20), thus defining a middle front prong 77*a*. A portion of the first end 73*a* of the second outer component 73 extends beyond the front component 74 in the first direction (in this example towards the guide rail 20), thus defining a second outer front prong 78*a*. A portion of the second end 71*b* of the first outer component 71 extends beyond the back component 75 in the first direction (in this example towards the backing plate 60), thus defining a first outer back prong 76*b*. In some examples, a portion of the second end 72*b* of the middle component 72 may extend beyond the back component 75 in the first direction (in this example towards the backing plate 60), thus defining a middle back prong 77*b*. A portion of the second end 73*b* of the second outer component 73 extends beyond the back component 75 in the first direction (in this example towards the backing plate 60), thus defining a second outer back prong 78*b*.

In the example of FIG. 5, no middle back prong 77*b* is provided. In such examples, the energy required to augment the magnetic field between the guide rail 20 and the actuator 44 to cause the actuator 44 to move to the second position may be less than the energy required to augment the magnetic field between the backing plate 60 and the actuator 44 in order to move the actuator 44 back to the first position from the second position. In other words, in such examples, the energy required to trip or actuate the actuator 44 may be less than the energy required to reset the actuator 44.

As shown in FIG. 5 and with reference to FIG. 6, the coil 69 of the electromagnet 66 is wound around the middle component 72. The middle component 72 thus forms the electromagnetic core of the electromagnet 66. One of the two permanent magnets is located at a generally equal distance between the first outer component 71 and the middle component 72. The other of the two permanent magnets is located at a generally equal distance from the second outer component 72 and the middle component 73. A first end of each of the two permanent magnets is housed by the front component 74. A second, opposite end of each of the two permanent magnets is housed by the back component 75.

In the example of FIG. 5 and with reference to FIG. 6, the support structure 70 is configured to guide the magnetic flux of the magnetic components of the array of magnetic components. In other words, the magnetic flux produced by the magnetic components of the array is directed to flow preferentially through the ferromagnetic support structure 70 so as to optimise the interactions between the magnetic fields of the electromagnet 66 and the two permanent magnets 68. The front prongs 76*a*, 77*a*, 78*a* of the first outer, middle and second outer components 71, 72, 73 are configured to guide the magnetic flux generated by the magnetic components of the array of magnetic components. The back prongs 76*b*, 78*b* of the first outer and second outer components 71, 73 are configured to guide the magnetic flux generated by the magnetic components of the array of magnetic components. In some examples, a back prong 77*b* of the middle component 72 may also be provided and configured to guide the magnetic flux generated by the magnetic components of the array of magnetic components.

While the support structure 70 has been described in relation to FIG. 5 and FIG. 6, other configurations are envisaged and it will be understood that such a support structure having all or some of the features described in relation to this example could be provided with any example of an actuator according to the disclosure.

The actuator 44 may further comprise one or more contact portions 80 provided on the frame for contacting the guide rail 20 when the actuator 44 is in the second position. In some examples (not shown), the contact portions may comprise high friction surfaces. In other examples, the one or more contact portions 80 may be provided as a separate component(s) attached to the actuator 44.

In FIG. 5, the actuator 44 is shown in the first position, corresponding to when the safety brake 42 is in a non-braking position, e.g. upon installation or after reset. The safety brake system 40 is mounted onto the car frame 14 (not shown in FIG. 5) via the mount, in this example mounting portion 49, such that the safety brake system 40 moves with the elevator car 16 in use along the guide rail 20. In the first position, the actuator 44 is magnetically attached to the backing plate 60 and is spaced away from the guide rail 20 as will be described further below.

The electromagnet 66 is in a first state when the actuator 44 is in the first position as shown in FIG. 5. In this example, no electric current is being supplied to electromagnet 66 and thus when the electromagnet 66 is in the first state, the electromagnet 66 does not generate a magnetic field. As a result, the array of magnetic components does not generate an augmented magnetic field on a first side and a reduced or cancelled magnetic field on another, opposite side. The actuator 44 (the frame in the example shown) is held against backing plate 60 due to the attractive magnetic force between the two permanent magnets 68 and the backing plate 60. The actuator 44 is therefore held away from the guide rail 20, defining a gap 45 between the actuator 44 and the guide rail 20.

Figure 10:
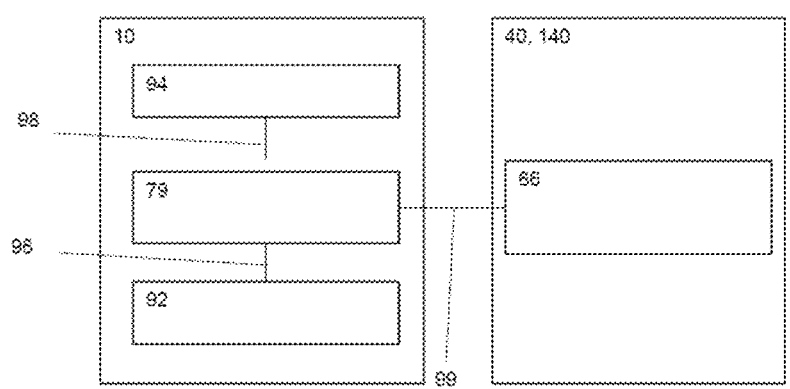
FIG. 10 is a schematic block diagram of emergency braking control for an elevator system and safety brake system according to an example of the disclosure.

A safety controller 79 (as shown in FIG. 10 and described in further detail below) is in electrical communication with the electromagnet 66. If a freefall, over-speed, or over-acceleration condition of the elevator car 16 is detected by the governor 22, the safety controller 79 is configured to switch the electromagnet 66 to a second state by supplying a pulse of electric current to the electromagnet 66 in a first direction of current flow. In alternative examples, the safety controller 79 may be configured to provide a continuous supply of electric current so as to maintain the electromagnet 66 in the second state after it has switched from the first state to the second state. In either example, the safety controller 79 is configured to energise the electromagnet 66 with a first polarity. When the electromagnet 66 is in the second state, the magnetic fields generated by the respective components of the array interact such that the magnetic fields generated by the magnetic components on a first side of the array are summed together to provide an augmented magnetic field on the first side of the array. In contrast, the magnetic fields generated by the magnetic components on a second, opposite side of the array are opposed and so sum together to provide a reduced magnetic field on the second, opposite side of the array. Thus, the array can be configured such that when the electromagnet 66 is in the second state, an attractive magnetic force between the array and the backing plate 60 is reduced or cancelled and an attractive magnetic force between the array and the guide rail 20 is strong or augmented. Thus, as will be described in further detail below with reference to FIG. 7, the actuator 44 (in this example, the frame) will be moved into the second position in contact with the guide rail 20 by the attractive magnetic force between the array of magnetic components and the guide rail 20.

Figure 7:
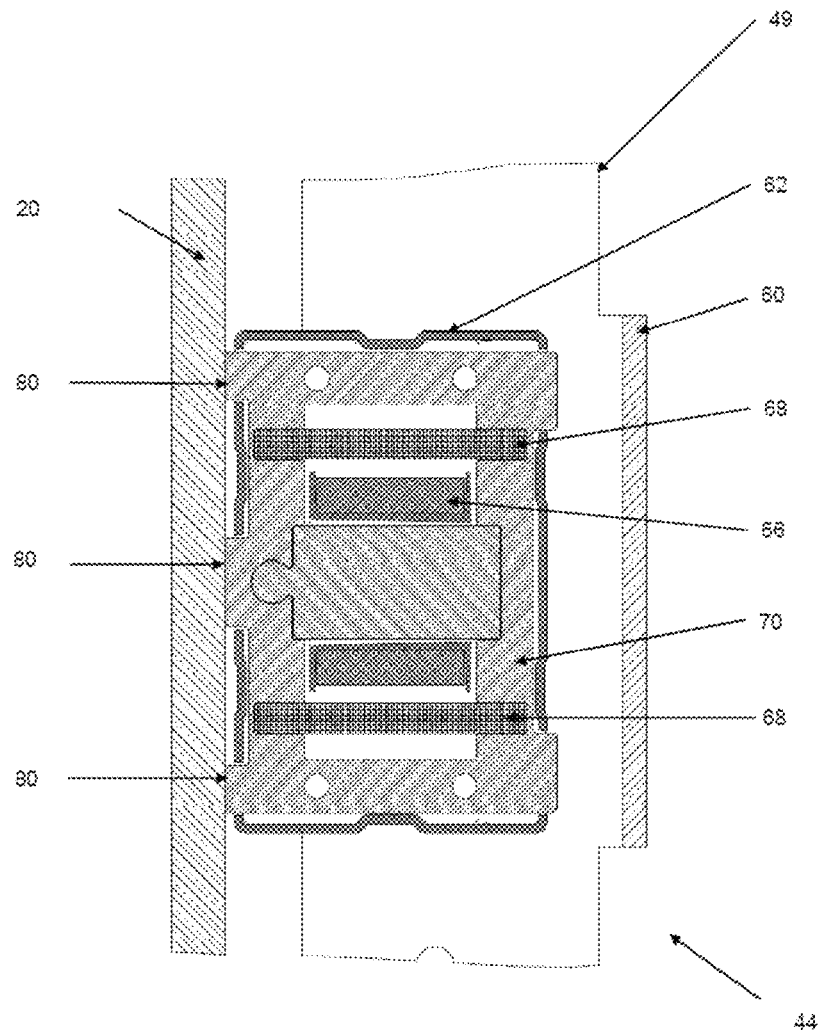
FIG. 7 is a schematic cross-sectional view of the part of the safety brake system of FIG. 5 with the actuator in a second position and with the safety brake in the first, non-braking position.

In FIG. 7, the actuator 44 of FIG. 5 is shown in the second position in contact with the guide rail 20 after the electromagnet 66 has been switched to the second state. In the example of FIG. 6, the electromagnet 66 reverts back to the first state once the safety controller 79 ceases supplying the electric current to the electromagnet 66. It will be understood that once the electromagnet 66 ceases generating a magnetic field, the magnetic fields generated by the respective components of the array can no longer interact such that the magnetic fields generated by the magnetic components on the first side of the array are augmented while the magnetic field on the second opposite side are reduced or cancelled. Therefore, when the actuator 44 is in the second position and the electromagnet 66 has reverted to the first state, in which no current is supplied to it, the actuator 44 is held in the second position against the guide rail 20 by the attractive magnetic force between the permanent magnets 68 and the guide rail 20. In other words, the actuator 44 is magnetically attached to guide rail 20 in the second position.

In other examples, the safety controller 79 may instead be configured to provide a continuous supply of electric current to the electromagnet 66 so that the actuator 44 is held in the second position against the guide rail 20 by the attractive magnetic force between the array of magnetic components and the guide rail 20. In other words, the safety controller 79 may be configured to maintain the electromagnet 66 in the second state while the actuator 44 is in the second position.

Once the actuator 44 is magnetically attached to the guide rail 20, movement of the elevator car 16 downwards relative to the guide rail 20 causes the actuator 44 to move upwards relative to the elevator car 16 to a third position. This is due to the downwards motion of the elevator car 16 and the actuator mounting portion 49 which is fixed to the elevator car 16 via the frame 14, and the fixed position of the guide rail 20. In some examples, this is at least in part due to the friction force produced between the guide rail 20 and the contact portions 80 (or support structure 70) which are held against the guide rail 20 by magnetic force, the friction force opposing the movement of the elevator car, thus resulting in an upwards reaction force. In other examples, the high friction surface of contact portions 80 may increase the friction force between the contact portions 80 and the guide rail 20 by having a higher coefficient of friction. This may act to hold the actuator 44 against the guide rail more reliably.

Figure 8:
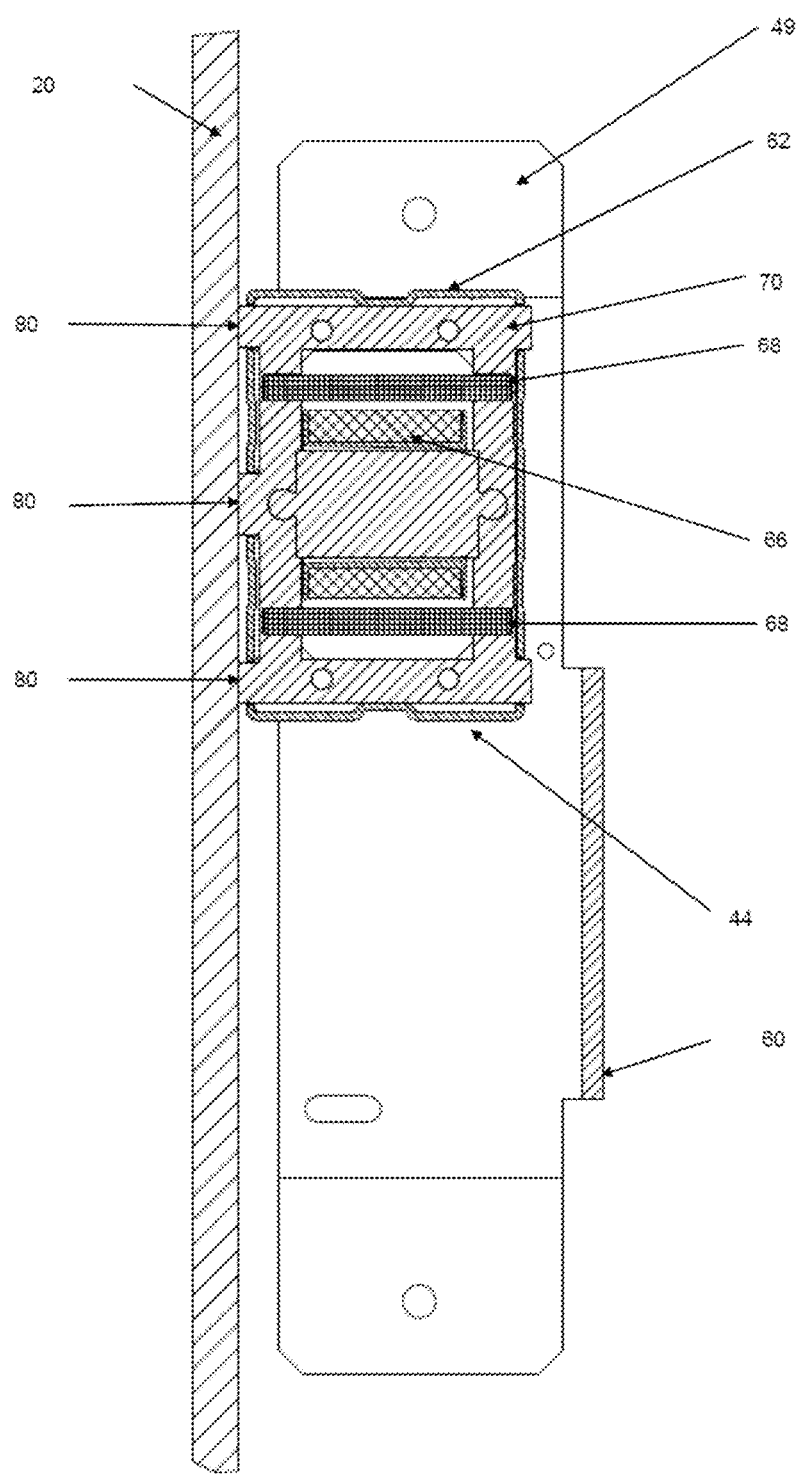
FIG. 8 is a schematic cross-sectional view of the part of the safety brake system of FIG. 5 with the actuator in a third position and with the safety brake in a second, braking position.

In FIG. 8, the actuator 44 of FIG. 5 is shown in the third position. When the actuator 44 is moved to the third position, the resulting upwards reaction force is applied to the linkage mechanism 56 (not shown), which is connected between the actuator 44 and the safety brake 42. The linkage mechanism 56 transmits the upwards reaction force to the roller of the safety brake 42 to move the roller upwards along the angled surface into the braking position such that it engages the guide rail 20 and prevents further downwards motion of the elevator car 16. Therefore, when an overspeed or freefall condition of an elevator car 16 is detected by a safety controller 79, the safety brake system 40 acts to prevent further downwards motion of the elevator car 16.

To reset the safety brake 42 and the actuator 44, the elevator car 16 is moved upwards. The elevator car 16 is moved upwards until the safety brake 42 is released and the actuator 44 is aligned with the backing plate 60. In some examples, aligning the actuator 44 with the backing plate 60 (i.e. the first ferromagnetic component) corresponds to moving the actuator 44 from the third position to the second position. The safety controller 79 is configured to then switch the electromagnet to a third state by suppling a pulse of electric current to the electromagnet 66 in a second direction of current flow. In other words, the safety controller 79 is configured to energise the electromagnet 66 with a second polarity. In this respect, the current flow supplied to switch the electromagnet 66 to the third state is opposite in direction to the current flow supplied to switch the electromagnet 66 to the second state and, consequently, the second polarity of the electromagnet 66 when the electromagnet 66 is in the third state is opposite to the first polarity of the electromagnet 66 when the electromagnet 66 is in the second state. When the electromagnet 66 is in the third state, the magnetic fields generated by the respective components of the array interact such that the magnetic fields generated by the magnetic components on the second side of the array are summed together to provide an augmented magnetic field on the second side of the array. In contrast, the magnetic fields generated by the magnetic components on the first, opposite side of the array are opposed and so sum together to provide a reduced magnetic field on the first side of the array. Thus, the array can be configured such that when the electromagnet 66 is in the third state, an attractive magnetic force between the array and the guide rail 20 is reduced or cancelled and an attractive magnetic force between the array and the backing plate 60 is strong or augmented. Thus, the actuator 44 (in this example, the frame) will be moved into contact with the backing plate 60 to the first position by the attractive magnetic force generated between the array of magnetic components and the backing plate 60. Once the electromagnet ceases to be supplied with electric current and so returns to its first state, the actuator 44 is held in the first position by the magnetic force between the permanent magnets 68 and the backing plate.

Figure 9:
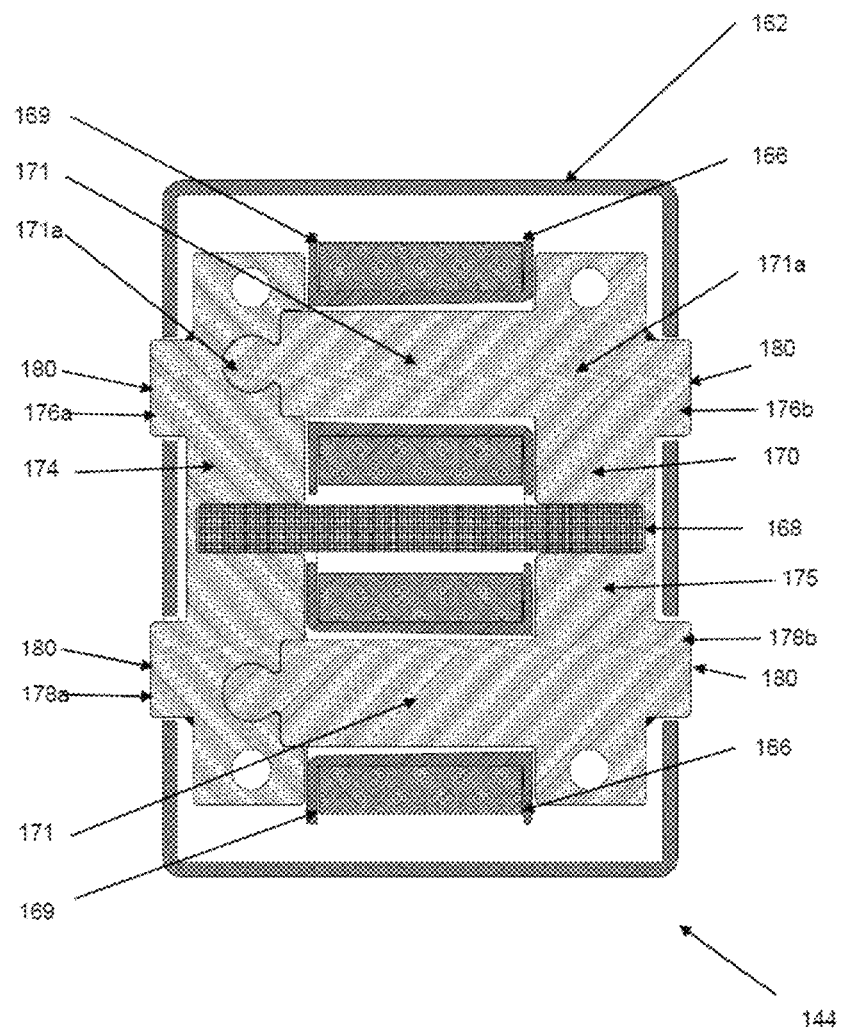
FIG. 9 is a schematic cross-sectional view of part of a safety brake system according to another example of the present disclosure.

A further example of a safety brake system 140 according to the disclosure is described in relation to FIG. 9. The safety brake system 140 operates in substantially the same way as described above and can be used with a safety brake 142 and linkage mechanism 156 in the manner described above. However, the actuator 144 of the example of FIG. 9 has an array of magnetic components comprising a permanent magnet 168 arranged between two electromagnets 166. In this example, the array is configured such that the magnetic fields, generated by the two electromagnets 166 when electric current is supplied by the safety controller 79, are opposite in direction to each other. The magnetic field generated by the permanent magnet 168 has a direction substantially perpendicular to the magnetic fields of the two electromagnets 166. As a result, the magnetic fields generated by the two electromagnets 166 and the permanent magnet 168 interact such that the array of magnetic components generates an augmented magnetic field on one side of the array and a reduced magnetic field on another side of the array.

In the example of FIG. 9, the support structure 170 defines a first outer component 171 and a second outer component 173. The first outer and second outer components 171, 173 extend in a direction generally parallel to the first direction. The first outer and second outer components 171, 173 are substantially parallel to one another. The first outer and second outer components 171, 173 are spaced apart from one another in a direction generally perpendicular to the first direction. The first outer and second outer components 171, 173 each comprise a first end 171a, 173a and a second end 171b, 173b. When the actuator 144 is in position in the elevator system, the first ends 171a, 173a of the first outer and second outer components 171, 173 are positioned to face the guide rail 20 and to be closer to the guide rail 20 than the second ends 171b, 173b of the first outer and second outer components 171, 173. The second ends 171b, 173b of the first outer and second outer components 171, 173 are positioned to face the backing plate 60 and to be closer to the backing plate 60 than the first ends 171*a*, 173*a* of the first outer and second outer components 171, 173.

The support structure 170 further defines a front component 174 and a back component 175 extending in a direction generally perpendicular to the first direction. The front and back components 174, 175 are substantially parallel to one another. The front and back components 174, 175 are spaced apart in a direction generally parallel to the first direction. The front and back components 174, 175 are each connected to each of the first outer and second outer components 171, 173. The front component 174 connects the first ends 171*a*, 173*a* of the first outer and second outer component 171, 173 to one another. The back component 175 connects the second ends 171*b*, 173*b* of the first outer and second outer components 171, 173 to one another.

As shown in FIG. 9, a portion of the first end 171*a* of the first outer component 171 extends beyond the front component 174 in the first direction (in this example towards the guide rail 20), thus defining a first outer front prong 176*a*. A portion of the first end 173*a* of the second outer component 173 extends beyond the front component 74 in the first direction (in this example towards the guide rail 20), thus defining a second outer front prong 178*a*. A portion of the second end 171*b* of the first outer component 171 extends beyond the back component 175 in the first direction (in this example towards the backing plate 60), thus defining a first outer back prong 176*b*. A portion of the second end 173*b* of the second outer component 173 extends beyond the back component 175 in the first direction (in this example towards the backing plate 60), thus defining a second outer back prong 178*b*.

As shown in FIG. 8, the coils 169 of the electromagnets 166 are wound around the first outer component 171 and the second outer component 173 respectively. The first outer component 171 and the second outer component 173 thus form the electromagnetic cores of the electromagnets 166 respectively. The permanent magnet 168 is located at a generally equal distance between the first outer component 171 the second outer component 173. A first end of the permanent 168 magnets is housed by the front component 174. A second, opposite end of the permanent magnets 168 is housed by the back component 175.

In the example of FIG. 8, the support structure 170 is configured to guide the magnetic flux of the magnetic components of the array of magnetic components. In other words, the magnetic flux produced by the magnetic components of the array is directed to flow preferentially through the ferromagnetic support structure 170 so as to optimise the interactions between the magnetic fields of the two electromagnets 166 and the permanent magnets 168. The front prongs 176*a*, 178*a* of the first outer and second outer components 171, 173 are configured to guide the magnetic flux generated by the magnetic components of the array of magnetic components. The back prongs 176*b*, 178*b* of the first outer and second outer components 171, 173 are configured to guide the magnetic flux generated by the magnetic components of the array of magnetic components. While the support structure 170 has been described in relation to FIG. 8, other configurations are envisaged and it will be understood that such a support structure having all or some of the features described in relation to this example could be provided with any example of an actuator according to the disclosure.

In a further set of examples of a safety brake system according to the disclosure, the safety brake system may be as shown in the example of FIGS. 5 to 7 or FIG. 9 and may operate in substantially the same way as described above. Further, it may be used with a safety brake and linkage mechanism in the manner described above. However, in these examples, when the electromagnet(s) of the first magnetic component or of the two second magnetic components is in a first state, the electromagnet(s) is supplied with an electric current in a first direction of current flow such that the magnetic fields generated by the magnetic components on a first side of the array are summed together to provide an augmented magnetic field on the first side of the array and the magnetic fields generated by the magnetic components on the second, opposite side of the array are summed together to provide a reduced magnetic field on the second, opposite side of the array. In other words, when the electromagnet(s) is in the first state, the actuator is held in a first position against the first ferromagnetic component by the augmented magnetic force on the first side of the array.

In this set of examples, the actuator is moved to the second position by reversing the direction of current flow of the electric current supplied to the electromagnet(s), the switching the electromagnet(s) to a second state. In the second position, the actuator is held in position against the second ferromagnetic component by an augmented magnetic force on the second side of the array. It will be appreciated that, in this set of examples, the safety controller is configured to continuously supply current to the electromagnet(s) and that switching the electromagnet(s) from the first state to the second state is achieved by reversing the direction of the current flow supplied. Therefore, in this set of examples the electromagnet(s) is either in the first state or the second state. To reset the safety brake and the actuator, the elevator car 16 is moved upwards until the safety brake is released and the actuator is aligned with the first ferromagnetic component. In some examples, aligning the actuator with the first ferromagnetic component corresponds to moving the actuator from the third position to the second position. The safety controller 79 is configured to then switch the electromagnet(s) to a third state (corresponding here to switching the electromagnet back to the first state) by suppling electric current to the electromagnet(s) in the first direction of current flow.

In any of the examples disclosed above, the linkage mechanism 56, 156 may take any suitable form for mechanical transmission of the upwards reaction force. Although the linkage mechanism 56, 156 has been illustrated in the form of a bar, it could be a wire, or a series of link members, or a plate, for example. In addition, although the safety brake 42 has been illustrated as being positioned below the actuator 44, it could instead be located above the actuator 44 with the upwards reaction force being transmitted as described.

Further, all the examples shown are configured for vertical movement of the elevator car 16 along a guide rail 20. It will be appreciated however that the examples of the disclosure could equally apply to an elevator or conveyance system in which the conveyance component is configured to move horizontally or in another non-vertical direction. Thus, the safety brake system according to various examples of the disclosure could be used to stop movement of a conveyance device in an upwards direction or in another, non-vertical direction, engagement of the actuator with guide rail causing a reaction force in a direction opposite to the direction of motion of the conveyance device relative to the guide rail, the reaction force causing the linkage to move the safety brake into engagement with the guide rail.

FIG. 10 shows a schematic block diagram of emergency braking control for the elevator system 10 and the safety brake systems 40, 140. The elevator system 10 further comprises a speed sensor 92, accelerometer 94 and a safety controller 79. The speed sensor 92 measures the speed of descent and ascent of the elevator car 16. The accelerometer 94 measures the acceleration of the elevator car 16. The safety controller 79 is arranged to receive a speed signal 96 from the speed sensor 92, and an acceleration signal 98 from the accelerometer 94, and to control an electrical power supply 99 to the at least one electromagnet 66 in the safety brake system 40, 140. The safety controller 79 will selectively supply electric current to the at least one electromagnet 66 or each electromagnet 166, e.g. upon the safety controller 79 detecting an overspeed condition for the elevator car 16 based on the speed signal 96, or upon the safety controller 79 detecting an over-acceleration condition for the elevator car 16 based on the speed signal 96 or the acceleration signal 98. In some examples, the safety controller 79 will selectively supply a pulse of electrical current to the electromagnet(s) 66, 166 of the first magnetic component or the two second magnetic components. In other examples, the safety controller 79 will selectively supply continuous electrical current to the electromagnet(s) 66, 166 of the first magnetic component or the second magnetic components such as to maintain the electromagnet(s) in a given state.

Figure 11A:
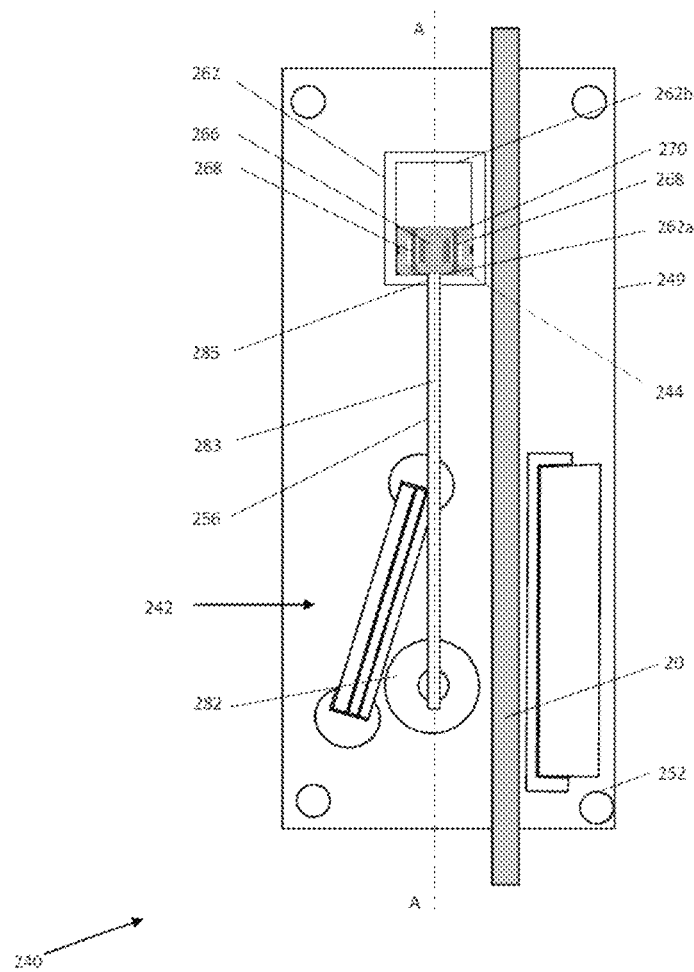
FIG. 11A is a schematic cross-sectional view of a safety brake system according to another example of the present disclosure with the safety brake in a first, non-braking position.
Figure 11B:
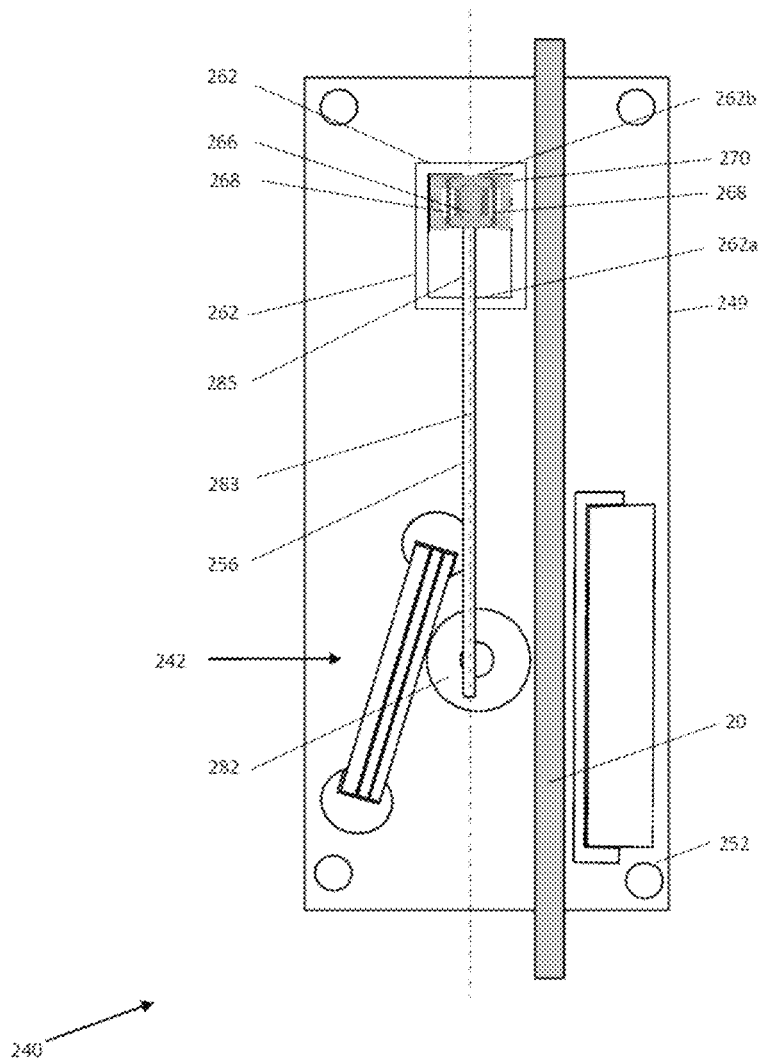
FIG. 11B is a schematic cross-sectional view of the safety brake system of the example of FIG. 11A with the safety brake in a second, braking position.

FIGS. 11A and 11B show a further example of a safety brake system 240 having an actuator 244 and a safety brake 242 with the safety brake being shown in a first, non-braking position in FIG. 11A and in a second, braking position in FIG. 11B. Although the safety brake illustrated in FIGS. 11A and 11B is a roller-type safety brake, it will be appreciated that the safety brake 242 may take any suitable form. The safety brake system 240 may be mounted to the elevator car frame 14 substantially in the same way as with the example of FIG. 2. In the example shown, the mount 249 comprises a single component. It will be understood however, that separate mounting components could be provided as in the earlier examples shown.

Regardless of the exact form of the safety brake 242, the safety brake 242 is coupled to an actuator 244 via a linkage mechanism 256. The actuator 244 comprises an array of magnetic components and is configured to be moved from a first position, adjacent to a first ferromagnetic component to a second position adjacent a second ferromagnetic component. The array of magnetic components comprises at least one first magnetic component and at least two second magnetic components. The first magnetic component is adjacent to and arranged between the two second magnetic components. The first magnetic component comprises one of a permanent magnet and an electromagnet and the second magnetic components each comprise the other of a permanent magnet and an electromagnet. Thus, when the first magnetic component is a permanent magnet, the two second magnetic components are electromagnets and when the first magnetic component is an electromagnet, the two second magnetic components are permanent magnets.

In the example of FIGS. 11A and 11B, the array of magnetic components comprises one electromagnet 266 (the first magnetic component) and two permanent magnets 268 (the second magnetic components). The electromagnet 266 is adjacent to and arranged between the two permanent magnets 268 such that the magnetic components are stacked in the direction perpendicular to the guide rail 20.

The actuator 244 is configured to move relative to the mount 249 along an axis parallel to the guide rail 20 between the first position the second position. The actuator 244 is therefore configured to provide movement to the linkage mechanism 256, thus moving the safety brake 242 between the non-braking and braking positions. The linkage mechanism 256 is coupled at one end to the roller 282 and extends along an axis 283 parallel to the guide rail or generally parallel to the guide rail 20 such as, for example, within 10° of parallel to the guide rail 20. As seen, the safety brake 242 is located below the actuator 244 in this example such that the linkage mechanism 256 can act to pull the roller 282 upwardly along the "wedge" surface 284 to move the safety brake 242 into the braking position. The roller 282 in the example shown is pulled upwardly along a braking axis, which in the example shown corresponds to the axis 283.

The safety brake system 240 further includes a housing 262 which is fixed to the mount 249 and encloses the actuator 244. The housing 262 may take any suitable shape and, in the example shown, comprises a hollow body, having a longitudinal axis A-A and first and second closed ends 262a, 262b. A safety lever 285 is provided, and in the example shown, is formed as a continuation of the linkage mechanism 256. In any example of the disclosure, the safety lever 285 may alternatively be a separate component from the linkage mechanism 256. The safety lever 285 extends into the housing 262 through the first closed end 262a thereof along a lever axis, which in the example shown corresponds to the longitudinal axis A-A of the housing 262 and extends parallel to the guide rail 20.

The actuator 244 is substantially the same as the actuator of the example of FIGS. 2 and 5. FIG. 11A shows the safety brake system 240 in a non-braking position when the actuator 244 is in the first position, e.g. upon installation or after reset. In this position, the actuator 244 is held in contact with the first closed end 262a of the housing 262 (the first ferromagnetic component) by the attractive magnetic force between the permanent magnets 268 and the first closed end 262a. In the first position, actuator 244 is spaced from the second closed end 262b of the housing 262 (the second ferromagnetic component). In the first position, the electromagnet 266 is in a first state, in this example receiving no electric current and thus not generating a magnetic field.

A safety controller 79 (as show on FIG. 10) is in electrical communication with the electromagnet 266. If a freefall, over-speed, or over-acceleration condition of the elevator car 16 is detected by the governor 22, the safety controller 79 is configured to switch the electromagnet to a second state by suppling a pulse of electric current to the electromagnet 266 in a first direction of current flow. In other words, the safety controller 79 is configured to energise the electromagnet 266 with a first polarity. When the electromagnet 266 is in the second state, the magnetic fields generated by the respective components of the array interact such that the magnetic fields generated by the magnetic components on a first side of the array are summed together to provide an augmented magnetic field on the first side of the array. In contrast, the magnetic fields generated by the magnetic components on a second, opposite side of the array are opposed and so sum together to provide a reduced magnetic field on the second, opposite side of the array. Thus, the array can be configured such that when the electromagnet 266 is in the second state, an attractive magnetic force between the array and the first closed end 262a is reduced or cancelled and an attractive magnetic force between the array and the second closed end 262b is strong or augmented. Thus, the actuator 244 (in this example, the frame 270) will be moved into contact with the closed end 262b, in other words to the second position, by the attractive magnetic force generated between the array of magnetic components and the closed end 262b. In the example of FIG. 11B, the actuator 244 is stopped by and/or rests against the second closed end 262b of the housing 262 when in the second position.

The safety lever 285 is connected to the actuator 244 and is thus moved along the axis 283 in the direction of travel of the actuator 244. The safety lever 285 is continuous with or coupled to the linkage mechanism 256 as described above in relation to FIGS. 11A and 11B. The linkage mechanism 256 is linked to the roller 282 or a similar component of the safety brake 242 such that the movement of the safety lever 285 pulls the roller 282 or other safety brake component upwardly in the example shown (but more generally in a direction opposite to the direction of movement of the elevator car 16 during a freefall, over-speed, or over-acceleration condition). The safety lever 285 thus acts to move the safety brake 242 into the braking position such that it engages the guide rail 20 and prevents further downwards motion of the elevator car 16. In other words, the safety brake 242 is actuated as a result of the electromagnet 266 being switched by the controller 79 from a first state when the electromagnet 266 is not supplied with an electric current to a second state when the electromagnet 266 is supplied with an electric current in a first direction.

In FIG. 11B, the actuator 244 of FIG. 11A is shown in the second position after the electromagnet 266 has been switched to the second state. The electromagnet 266 reverts back to the first state once the safety controller 79 ceases supplying the pulse of electric current to the electromagnet 266. It will be understood that once the electromagnet 266 ceases generating a magnetic field, the magnetic fields generated by the respective components of the array can no longer interact to augment the magnetic fields generated by the magnetic components on the first side of the array and to cancel the magnetic field on the second opposite side. When the actuator 244 reverts to the first state, the actuator 244 is held in the second position against the second closed end 262b by the magnetic attraction between the permanent magnets 268 and the closed end 262b. In other words, the actuator 44 is magnetically attached to the closed end 262b in the second position.

To reset the safety brake 242 and the actuator 244 of the safety brake system 240 from the braking to the non-braking position, the safety controller 79 is configured to switch the electromagnet 266 to a third state by suppling a pulse of electric current to the electromagnet 266 in a second direction of current flow, wherein the second direction of current flow is opposite to the first direction of current flow. When the electromagnet 266 is in the third state, the magnetic fields generated by the respective components of the array interact such that the magnetic fields generated by the magnetic components on the second side of the array are summed together to provide an augmented magnetic field on the second side of the array. In contrast, the magnetic fields generated by the magnetic components on the first, opposite side of the array are opposed and so sum together to provide a reduced magnetic field on the first side of the array. Thus, the array can be configured such that when the electromagnet 266 is in the third state, an attractive magnetic force between the array and closed end 262b is reduced or cancelled and an attractive magnetic force between the array and the first closed end 262a is strong or augmented. Thus, the actuator 244 (in this example, the frame 270) will be moved into contact with the closed end 262a to the first position by the attractive magnetic force between the array of magnetic components and closed end 262a. Once the electromagnet 266 ceases to be supplied with electric current, the actuator 244 is held in the first position by the magnetic force between the permanent magnets 268 and the first closed end 262a. In this and other examples, the elevator car 16 may optionally be moved along the guide rail 20 in a direction opposite to the direction of movement of the elevator car 16 during a freefall, over-speed, or over-acceleration condition prior to the electromagnet 266 being switched by the safety controller 79 so as to reset the safety brake.

With reference to FIG. 10, the elevator system 10 comprises a safety controller 79. The elevator system 10 further comprises a speed sensor 93 and an accelerometer 94. The speed sensor 92 measures the speed of descent and ascent of the elevator car 16. The accelerometer 94 measures the acceleration of the elevator car 16. The safety controller 79 is arranged to receive a speed signal 96 from the speed sensor 92, and an acceleration signal 98 from the accelerometer 94, and to control an electrical power supply 99 to the at least one electromagnet 266 in the safety brake system 240. In a set of examples, the elevator system 10 may comprise either a speed sensor 93 or an accelerometer 94. In some examples, the speed sensor 93 may measure the acceleration and the speed of descent and ascent of the elevator car 16. In other examples, the accelerometer 94 may measure the acceleration and the speed of descent and ascent of the elevator car 16.

The safety controller 79 will selectively supply electric current to the at least one electromagnet 266, e.g. upon the safety controller 79 detecting an overspeed condition for the elevator car 16 based on the speed signal 96, or upon the safety controller 79 detecting an over-acceleration condition for the elevator car 16 based on the speed signal 96 or the acceleration signal 98. In some examples, the safety controller 79 will selectively supply a pulse of electrical current to the electromagnet(s) 266 of the first magnetic component or the two second magnetic components. In other examples, the safety controller 79 will selectively supply continuous electrical current to the electromagnet(s) 266 of the first magnetic component or the second magnetic components so as to maintain the electromagnet(s) in a given state.

In a further set of examples of a safety brake system according to the disclosure, the safety brake system may be as shown in the example of FIGS. 10A and 10B and may operate in substantially the same way as described above. Further, it may be used with a safety brake and linkage mechanism in the manner described above. However, in these examples, the actuator comprises an array of magnetic components comprising a permanent magnet arranged between two electromagnets. In these examples, the array is configured such that the magnetic fields, generated by the two electromagnets when electric current is supplied by the safety controller, are opposite in direction to each other. The magnetic field generated by the permanent magnet has a direction substantially perpendicular to the magnetic fields of the two electromagnets. As a result, the magnetic fields generated by the two electromagnets and the permanent magnet interact such that the array of magnetic components generates an augmented magnetic field on one side of the array and a reduced magnetic field on another side of the array.

In a further set of examples of a safety brake system according to the disclosure, the safety brake system may be as shown in the example of FIGS. 11A and 11B and may operate in substantially the same way as described above. Further, it may be used with a safety brake and linkage mechanism in the manner described above. However, in these examples, when the electromagnet(s) of the first magnetic component or of the two second magnetic components is in a first state, the electromagnet(s) is supplied with an electric current in a first direction of current flow such that the magnetic fields generated by the magnetic components on a first side of the array are summed together to provide an augmented magnetic field on the first side of the array and the magnetic fields generated by the magnetic components on the second, opposite side of the array are summed together to provide a reduced magnetic field on the second, opposite side of the array. In other words, when the electromagnet(s) is in the first state, the actuator is held in a first position against the first ferromagnetic component by the augmented magnetic force on the first side of the array.

In this set of examples, the actuator is moved to the second position by reversing the direction of current flow of the electric current supplied to the electromagnet(s), the switching the electromagnet(s) to a second state. In the second position, the actuator is held in position against the second ferromagnetic component by an augmented magnetic force on the second side of the array. It will be appreciated that, in this set of examples, the safety controller is configured to continuously supply current to the electromagnet(s) and that switching the electromagnet(s) from the first state to the second state is achieved by reversing the direction of the current flow supplied. Therefore, in this set of examples the electromagnet(s) is either in the first state or the second state. To reset the safety brake and the actuator, the elevator car 16 is moved upwards until the safety brake is released. The safety controller is configured to then switch the electromagnet(s) back to the first state by suppling electric current to the electromagnet(s) in the first direction of current flow.

It will be appreciated by those skilled in the art that the disclosure has been illustrated by describing one or more examples thereof, but is not limited to these examples; many variations and modifications are possible, within the scope of the accompanying claims. For example, the safety brake system may be used in a roped or ropeless elevator system, or another type of conveyance system.

What is claimed is:

1. A safety brake system for use in a conveyance system including a guide rail and a conveyance component moveable along the guide rail, the safety brake system comprising:
   a safety brake moveable between a non-braking position where the safety brake is not in engagement with the guide rail and a braking position where the safety brake is engaged with the guide rail;
   a linkage mechanism; and
   an actuator for the safety brake, the actuator being configured to be mounted to the conveyance component and positioned between first and second ferromagnetic components, the actuator comprising:
   an array of magnetic components comprising a first magnetic component adjacent to and arranged between two second magnetic components, wherein the first magnetic component comprises one of a permanent magnet and an electromagnet and wherein the second magnetic components each comprise the other of a permanent magnet and a electromagnet,
   wherein the two second magnetic components each include a first pole having a first polarity and a second pole having a second polarity, the first pole of a first of the second magnetic components faces a first pole of a second of the second magnetic components and the second pole of the first of the second magnetic components faces away from the first magnetic component and the second pole of the second of the second magnetic components faces away from the first magnetic component, such that the magnetic fields of the two second magnetic components are opposite in direction to each other,
   wherein the magnetic components of the array are arranged such that when the electromagnet of the first or second magnetic components is in a first state, the actuator is held in a first position against the first ferromagnetic component,
   wherein when the electromagnet of the first or second magnetic components is switched from the first state to a second state, the magnetic field between the array and the first ferromagnetic component is reduced to a value less than when the electromagnet is in the first state and the magnetic field between the array and the second ferromagnetic component is augmented to a value greater than when the electromagnet is in the first state so as to move the actuator from the first position to a second position against the second ferromagnetic component, and
   wherein the linkage mechanism is coupled between the safety brake and the actuator such that movement of the actuator from the first position to the second position when the electromagnet is switched from the first state to the second state causes the safety brake to move into the braking position;
   wherein the actuator further comprises a ferromagnetic support structure housing the magnetic components of the array so as to guide the magnetic flux produced by the magnetic components of the array to flow through the ferromagnetic support structure;
   wherein the ferromagnetic support structure includes a first outer component, a middle component and a second outer component, the first outer component, the middle component and the second outer component each extending in a first direction parallel to a the direction of travel of the movement of the actuator from the first position to the second position;
   wherein the first outer component, the middle component and the second outer component are spaced apart from one another along a second direction perpendicular to the first direction, the first magnetic component supported on the middle component, one of the second magnetic components being positioned between the first magnetic component and the first outer component along the second direction and another of the second magnetic components being positioned between the first magnetic component and the second outer component along the second direction.

2. The safety brake system of claim 1, wherein, in the first state, the electromagnet of the first or second magnetic component is not energised,
   wherein the actuator is held in the first position against the first ferromagnetic component by the permanent magnet of the first or second magnetic components.

3. The safety brake system of claim 1, wherein the magnetic components of the array are arranged such that when the actuator is in the second position, and when the electromagnet of the first or second magnetic components is not energised, the permanent magnet of the first or second magnetic components act to hold the actuator in the second position against the second ferromagnetic component.

4. The safety brake system of claim 1, wherein, in the second state, the electromagnet of the first or second magnetic component is energised with a first polarity and, in the first state, the electromagnet of the first or second magnetic component is energised with a second, opposite polarity.

5. The safety brake system of claim 1, wherein when the electromagnet of the first or second magnetic components is switched to a third state, the magnetic field between the array and the first ferromagnetic component is augmented and the magnetic field between the array and the second ferromagnetic component is reduced so as to move the actuator from the second position to the first position.

6. The safety brake system of claim 5, wherein, the electromagnet of the first or second magnetic components is energised with a first polarity in the second state, and is energised with a or the second, opposite polarity in the third state.

7. The safety brake system of claim 1, further comprising a mount for attaching the actuator to the conveyance component,
wherein the first ferromagnetic component is part of or is fixed to the mount.

8. The safety brake system of claim 1, wherein the array comprises a plurality of first magnetic components and wherein each first magnetic component is arranged between two second magnetic components.

9. The safety brake system of claim 1, wherein the second ferromagnetic component is the guide rail.

10. The safety brake system of claim 9, wherein the actuator further comprises:
a contact portion comprising a high friction surface, and configured to be spaced apart from the guide rail when the actuator is in the first position and configured to be in contact with the guide rail when the actuator is in the second position,
wherein the safety brake system is configured such that when the conveyance component is moving downwards relative to the guide rail, movement of the actuator to the second position creates an upwards reaction force transmitted by the linkage mechanism to move the safety brake into the braking position.

11. The safety brake system of claim 1, wherein the first ferromagnetic component is a backing plate and the second ferromagnetic component is the guide rail.

12. An elevator system comprising:
an elevator car driven to move along at least one guide rail; and
the safety brake system of claim 1, wherein the safety brake is arranged to be moveable between the non-braking position where the safety brake is not in engagement with the guide rail and the braking position where the safety brake is engaged with the guide rail,
wherein the actuator is configured to move relative to the elevator car.

13. An elevator system as claimed in claim 12 and further comprising:
a speed sensor and a controller arranged to receive a speed signal from the speed sensor and to selectively switch the electromagnet of the first or second magnetic component from the first state to the second state upon detecting an overspeed or over-acceleration condition for the elevator car based on the speed signal; and/or
an accelerometer and a controller arranged to receive an acceleration signal from the accelerometer and to selectively switch the electromagnet of the first or second magnetic component from the first state to the second state upon detecting an over-acceleration condition for the elevator car.

* * * * *